3,351,079
LOW FLUID LOSS COMPOSITIONS

Daniel L. Gibson, Tulsa, Okla., assignor to The Dow Chemical Company, Midland, Mich., a corporation of Delaware
No Drawing. Filed Sept. 28, 1962, Ser. No. 227,032
1 Claim. (Cl. 137—13)

This invention relates to the treatment of non-aqueous fluids used in well-working operations such as drilling and hydraulic fracturing. More particularly, it relates to additives which when intermixed with a well-fracturing fluid will reduce the loss of the fluid during the fracturing operation.

To increase the productivity of oil or gas wells, it is frequently desirable to enhance the flow of formation fluids through the formation into the well bore by creating new flow channels or fractures. For this purpose a special fluid composition, generally called a fracturing fluid, is pumped down into the well in contact with the formation to be fractured. Then the pressure of the fluid composition is increased until the formation is fractured by the hydraulic pressure. After the fracture has been extended to the extent desired, the pressure in the well bore is decreased and the fracturing fluid flows back into the well bore for recovery. It is common practice to include in the fracturing formulation a propping material, such as sand, whereby the propping material is carried into the fracture and deposited in it to keep it open when the fracturing fluid is withdrawn.

A primary concern in the art of fluid fracturing has been to control the penetrating characteristics of the fracturing fluid. Obviously the quantity of fluid required to produce a fracture of a given size decreases if the fluid can be prevented from flowing outside the desired fracturing zone. A further consideration in the formulation of fracturing fluids is viscosity since it is frequently necessary to hold sand or other propping agents in suspension while the fluid is being pumped into the well formation.

The present invention contemplates a non-aqueous well-working fluid composition using a greatly reduced amount of oil-insoluble solids as compared to the amounts required in conventional formulations. More particularly, it involves the use of various additives in a non-aqueous fracturing fluid to serve the dual purpose of fluid loss control agent and viscosity builder.

An object of this invention is to provide an economical, non-aqueous, low fluid loss composition for well-working operations. A further object of this invention is to provide a low fluid loss composition comprising a hydrocarbon liquid carrier and only a minor amount of an additive for reducing the fluid loss properties of the composition. Still another object is to control the viscosity of the low fluid loss composition. Other objects and advantages will be evident from the following description of the invention.

The above and other objectives are obtained by intermixing with a non-aqueous fracturing fluid from about 0.01 to 2.5 percent by weight of an essentially amorphous, linear, high molecular weight copolymer of ethylene with one or more aliphatic $C_3$ to $C_6$ $\alpha$-olefins.

The non-aqueous liquid which comprises the bulk of the fracturing fluid described herein may be essentially any liquid hydrocarbon having a viscosity between 0.2 and 200 cps. at 70° F. For example, crude oil which is normally available in the vicinity of oil well-working operations is most satisfactory. Such crude oils range in viscosity from 5 to 100 cps. but usually between 15 to 25 cps. at 70° F. In addition refined petroleum products such as kerosene, pale oil, diesel oil, fuel oil, etc., may be used.

To the non-aqueous liquid is added and intermixed using conventional techniques a minor amount of an amorphous copolymer of ethylene with one or more aliphatic $C_3$ to $C_6$ $\alpha$-olefins such as propylene, butene-1, or pentene-1. Particularly desirable are copolymers of ethylene-propylene prepared from a monomeric mixture containing 20–75 mole percent ethylene and 80–25 mole percent propylene, although similar copolymers of ethylene-butene-1, or a ternary copolymer of ethylene-propylene-butene-1 are also useful. Such copolymers are prepared by polymerization of the olefin mixture with certain coordination catalysts, as described in Belgium Patent 573,-749 and Italian Patent 554,803. The catalysts is a mixture of an organometallic compound with a transition metal compound, preferably a mixture of trialkyl aluminum with $TiCl_4$, $VCl_4$, or $VOCl_3$. However, other catalyst compositions of a similar nature may be desirable for particular polymerization systems.

Under the selected conditions of polymerization, the resulting linear copolymer is essentially amorphous having a very low degree of crystallinity as shown by X-ray measurements and has a molecular weight in the range of from 100,000 to 1,000,000 or greater. The comonomer distribution in the final product is probably random. The properties of the polymerization product are peculiarly characteristic of elastomeric materials, i.e., low modulus, high elongation, high reversible elastic recovery, and high resilience.

To achieve the desired dual purpose of reducing the fluid loss and providing the necessary thickening or viscosity build to support sand or other solid materials added to the fracturing fluid, only relatively minor amounts of the amorphous copolymer is required, i.e., from about 0.01 to 2.5 weight percent based on the non-aqueous liquid. With the preferred ethylene-propylene copolymer, optimum fluid properties are achieved with from 0.3 to 1.0 weight percent of the additive. Larger amounts may be used if a higher viscosity is needed, for example, to achieve proper suspension of solid additives. However amounts appreciably greater than 2.5 weight percent are generally not advantageous. At lower concentrations and particularly in the range from 0.01 to 0.3 weight percent of the additive, another inherent characteristic of the system described herein is evident in the decrease in friction loss when the fluid is pumped or transferred at high velocity under conditions wherein turbulent flow is normally encountered.

It has also been discovered that the fluid loss properties of the fracturing fluids described herein can be improved by the addition of various other materials as secondary additives. In particular, small quantities of finely divided, oil-insoluble solids are beneficially intermixed with the amporphous copolymer and hydrocarbon carrier liquid. Such solids are known by those skilled in the art to improve the fluid loss properties of non-aqueous fracturing fluids. It is believed that such solids prevent fluid loss by depositing on the faces of the well bore formations in contact with the fracturing liquid thus forming a barrier to the penetration of the fracturing fluid. As shown by Brown and Landers in U.S. Patent 2,779,735, a particle size in the range from 0.005 to 2 microns is preferred. Examples of effective oil-insoluble solids which can be obtained in finely divided form are blown asphalt, diatomaceous earth, silica flour, oyster shell flour, and such inorganic salts as calcium carbonate and calcium sulfate. Beneficial results have been obtained using from 0.01 to 1.0 weight percent of such finely divided, oil-insoluble solids, but an amount of from 0.1 to 0.5 weight percent is preferred.

Oil-soluble surfactants of both the anionic and cationic types have also been found to enhance the fluid loss control obtained with amorphous ethylene copolymers. Such materials are believed to function by reducing the interfacial tension at the fluid and well formation interface with the ionic groups of the surfactant acting further to enhance the adhesion of the fluid loss control additives to the surfaces of the formation. By "oil-soluble" it is meant that the material is at least partially dissolved into oil to form a mixture wherein the active constituents may be infinitely diluted with oil. Such oil solubility is readily determined by a simple trial.

Many suitable anionic and cationic surfactants are available commercially (cf. J. W. McCutcheon, Inc., "Detergents and Emulsifiers—Up to Date," 1962). More particularly, it has been found that well-known anionic surfactants, such as the fatty acids, alkane sulfonates, and alkyl aryl sulfonates, commercially available as Aerosol 18, Aerosol MA, Atlas G-711, Duponol AM, tall oil, red oil, Tergitol 4, Tergitol 7, Triton X-200, etc., enhance the fluid loss properties of solutions containing the EP copolymers. Similarly, cationic surfactants of the quaternary ammonium and nitrogen base types, commercially available under such trade names as Alamine 221, Aliquat 21, Priminox 10, Armeen 18 series, Arquad 12-50 series, Triton X-400, etc., also are beneficial. When employed as a secondary additive, it is generally necessary to use from 0.1 to 2 weight percent of the oil-soluble surfactant. The optimum concentration will, of course, depend upon the particular surfactants employed.

It is occasionally advantageous to employ both finely divided, oil-insoluble solids and an oil-soluble anionic or cationic surfactant with the amorphous ethylene copolymer additives described herein to improve the fluid loss control of non-aqueous fracturing fluids.

To prepare a non-aqueous fracturing fluid following the teachings of this invention, 10,000 gallons of kerosense are placed in a suitable mixing tank. To this is added 500 pounds (0.7 weight percent) of a high molecular weight, amorphous ethylene-propylene copolymer, and the kerosone-copolymer mixture is circulated with a high speed pump for 5 to 15 minutes to dissolve the copolymer. The resulting fluid is ready for use or further formulation. It has a viscosity of about 11 cps. at 70° F. and a fluid loss of 8 ml. in 25 minutes at 180° F. and 1,000 p.s.i. in the standard API RP-39 test. Untreated kerosene under similar conditions has a viscosity of 1.7 cps. and a fluid loss of 150 ml. in less than 10 seconds.

In order that those skilled in the art may better understand how the present invention can be carried out, the following examples are given by way of illustration and not by way of limitation. Unless otherwise specified, all parts and percentages are by weight. Fluid loss tests, sand falling rates, viscosity measurements, and formation damage tests were conducted in accordance with API RP-39, July 1960, "Recommended Practice Standard Procedure for the Evaluation of Hydraulic Fracturing Fluids." The test fluids were mixed for 3 minutes at high speed in a Waring Blendor. The factor $C_w$ is used as a further measure of the efficiency of the fluid loss additive. It is defined by the equation:

$$C_w = 0.0164 \sqrt{time} \text{ slope}/A$$

wherein the $\sqrt{time}$ slope of the fluid loss curve is determined by the method of API RP-39 and A is the filter area in cm.$^2$.

*Example 1.—Amorphous ethylene-propylene (EP) copolymers*

The required EP copolymers are prepared by standard copolymerization techniques using a catalyst system composed of a trialkyl aluminum and vanadium or titanium chloride with an olefin feed containing from 20 to 75 mole percent ethylene. The physical properties of several EP copolymers used as fluid loss additives are given in Table 1.

TABLE 1.—PHYSICAL DATA ON ETHYLENE-PROPYLENE COPOLYMERS

| Material | RSV [1] | MW [2] | Cryst.[3] | Composition (mole percent $C_2H_4$) [4] |
|---|---|---|---|---|
| EP-1 | 15.5 | >10$^5$ | 1.3 | 43.5 |
| EP-2 | 13.7 | >10$^5$ | 1.4 | 48.5 |
| EP-3 | 14.3 | >10$^5$ | 3.1 | 54.0 |
| EP-4 | 16.9 | >10$^5$ | 1.6 | 42.0 |
| EP-5 | 11.4 | >10$^5$ | 5.1 | 53 |
| EP-6B [5] | 10.5 | ~10$^5$ | | |

[1] Reduced specific viscosity, 0.02 g. in 100 ml. Decalin at 135° C.
[2] Estimated from RSV.
[3] Relative X-ray crystallinity.
[4] IR determination.
[5] A blend from three runs with 10% calcium stearate and 0.4% candelilla wax added.

*Example 2.—Effect of EP copolymer on kerosene fluid loss*

Data on the fluid loss of kerosene containing 0.37 wt. percent of the EP copolymers described in Example 1 are presented in Table 2. Note the appreciable reduction in fluid loss under both test conditions using only a small amount of the EP copolymer. The viscosity of the kerosene was increased from 1.7 to about 6.5 cps. at 70° F. by the addition of the EP copolymers.

TABLE 2.—EFFECT OF EP COPOLYMER ON FLUID LOSS WITH KEROSENE
[0.37 wt. percent EP in kerosene]

| Material | Fluid Loss, 80° F., 100 p.s.i. | | | Fluid Loss, 180° F., 1,000 p.s.i. | | |
|---|---|---|---|---|---|---|
| | Spurt (ml.) | $C_w \times 10^3$ | Ml./25 min. | Spurt (ml.) | $C_w \times 10^3$ | Ml./25 min. |
| Blank | | | | (160 ml., 9 sec.) | | |
| EP-1 | 3 | 0.28 | 5.5 | 5.5 | 1.14 | 14 |
| EP-2 | 3.5 | 0.21 | 7 | 5.5 | 1.43 | 15 |
| EP-3 | 1.0 | 0.56 | 5 | 0.5 | 0.91 | 7 |
| EP-4 | 16 | 0.98 | 23 | 6.0 | 1.4 | 16 |
| EP-6B | 0 | 1.12 | 8 | 2.0 | 1.4 | 12 |

*Example 3.—EP copolymer concentration*

The effect of the EP copolymer concentration on the viscosity and fluid loss in kerosene is shown in the data in Table 3 using EP-1. Similar results are obtained with other EP copolymers and demonstrate the utility of these materials as fluid loss additives when used in low concentrations.

TABLE 3.—EFFECT OF EP COPOLYMER CONCENTRATION ON VISCOSITY AND FLUID LOSS WITH KEROSENE

| Conc. of EP-1 (wt. percent) | Visc. (cps. at 70° F.) | Fluid Loss, 180° F., 1,000 p.s.i.; ml./25 min. |
|---|---|---|
| Blank | 1.7 | (160 ml., 9 sec.) |
| 0.06 | 1.8 | (160 ml., <25 min.) |
| 0.18 | 2.5 | 41 |
| 0.37 | 6.2 | 14 |
| 0.75 | 14.3 | 14 |

*Example 4.—Rheology of EP copolymer solutions in kerosene*

Rheology data for the EP copolymer system in kerosene are presented in Table 4. The copolymers mix readily with kerosene and the resulting mixtures are quite stable to high shear as shown by data in Table 5. The mixing conditions reported in Table 4 are similar to those encountered in field operation.

TABLE 4.—RHEOLOGY DATA FOR EP COPOLYMERS
[0.75 wt. percent in kerosene at 80° F.]

| Condition a | Fann Viscosity b | | | Sand Falling Rate, ft./min. |
|---|---|---|---|---|
| | Cps./300 r.p.m. | $n'$ | $K' \times 10^4$ | |
| Initial | 3.4– 9.6 | 0.94–0.96 | 0.92–2.5 | |
| Mixed | 9.0–17.2 | 1.00–1.03 | 2.0 –2.9 | 5.7–8.4 |
| Final | 10.5–18.4 | 0.94–0.98 | 2.5 –5.6 | | a Initial addition: Mixed—circulated 5 min. with Viking pump; Final—48 hours after mixing.
b API RP-39: $n'$=flow behavior index; $K'$=consistency index.

TABLE 5.—EFFECT OF MIXING CONDITIONS ON FLUID LOSS WITH EP COPOLYMER
[0.37% EP-6B; 125° F., 1,000 p.s.i.]

| Mixing Time* | Fluid Loss, 125° F., 1,000 p.s.i. | | |
|---|---|---|---|
| | Spurt (ml.) | $C_w \times 10^3$ | Ml. in 25 min. |
| 1 min | 1.0 | 0.44 | 5.4 |
| 3 min | 2.6 | 0.56 | 6.6 |
| 5 min | 2.5 | 0.49 | 6.0 |

*High speed Waring Blendor.

*Example 5.—Secondary additives*

A. Fluid loss tests of a typical EP copolymer in kerosene with other additives show that the fluid loss can be improved considerably by the incorporation of small amounts of finely divided, oil-insoluble solids. The data presented in Table 6A demonstrate that the spurt loss may be reduced by as much as 75 percent and the fluid loss by about 25 to 50 percent using commercially available, finely divided, oil-insoluble solids.

TABLE 6A.—EFFECT OF ADDITIVES ON EP COPOLYMER FLUID LOSS
[0.37 wt. percent EP-6B in kerosene; 150° F., 1,000 p.s.i.]

| Additive | Conc. (wt. percent) | Spurt (ml.) | $C_w \times 10^3$ | Fluid Loss, ml./25 min. |
|---|---|---|---|---|
| Blank | | 4 | 0.91 | 10.6 |
| Oyster Shell Flour | 0.12 | 0.3 | 0.98 | 7.5 |
| Do | 0.37 | 0 | 0.76 | 5.4 |
| Ground Silica | 0.19 | 0.5 | 0.91 | 7.0 |
| Powdered Gilsonite | 0.37 | 4.0 | 0.62 | 8.8 |
| Diatomaceous Earth | 0.37 | 0.5 | 1.68 | 12.2 |
| $CaCO_3$ | 0.37 | 2.0 | 1.19 | 7.5 |
| $CaSO_4$ | 0.37 | 3.0 | 1.40 | 13.0 |

B. Typical results for similar tests with several commercial anionic and cationic surfactants are given in Table 6B to demonstrate the utility of these materials as secondary additives.

TABLE 6B.—EFFECT OF ADDITIVES ON EP COPOLYMER FLUID LOSS
[0.37 wt. percent EP-6B in kerosene; 150° F., 1,000 p.s.i.]

| Additive | Conc. (wt. percent) | Spurt (ml.) | $C_w \times 10^3$ | Fluid Loss, ml./25 min. |
|---|---|---|---|---|
| Blank | | 4 | 0.91 | 10.6 |
| Tall Oil | 1.0 | 1.0 | 0.86 | 6.4 |
| Red Oil | 0.37 | 0 | 1.0 | 7.2 |
| Alamine | 0.12 | 1.0 | 0.86 | 6.4 |
| Aliquat 21 | 1.0 | 0 | 1.12 | 8.0 |
| Priminox 10 | 1.0 | 1.5 | 0.98 | 8.6 |
| Primdiene JMT | 2.0 | 1.0 | 0.87 | 6.2 |
| Redicote 2323 | 1.0 | 1.0 | 0.84 | 7.0 |

*Example 6.—Fluid loss with crude oils*

Tests carried out with a variety of crude oils and one refined oil indicate that beneficial results are obtained by the addition of small amounts of the EP copolymers. The viscosity of the crude oil was increased from 2 to 5 times by the addition of the EP copolymer.

TABLE 7.—EFFECT OF EP COPOLYMER ON FLUID LOSS WITH CRUDE OIL

[180° F., 1,000 p.s.i.]

| Crude Oil | Gravity (° API) | Fluid Loss | |
|---|---|---|---|
| | | Untreated | Treated [1] |
| Hunter Formation, Colorado | 48.2 | 160 ml. <1 min | 11.5 ml./25 min. |
| Miocene Formation, Louisiana | 40.7 | 160 ml. <1 min | 6.5 ml./25 min. |
| Manning Formation, Texas | 30.3 | 160 ml. <1 min | 20 ml./25 min. |
| Bartlesville Formation, Oklahoma | 21.6 | 160 ml. <1 min | 29 ml./25 min. |
| Frac Oil No. 2 (refined oil) | 12.8 | 160 ml. <1 min | 33 ml./25 min. |

[1] 0.75 wt. percent EP-5.

*Example 7.—Comparison of fluid loss additives*

Data in Table 8 provide a comparison of the EP copolymer with two commercial fluid loss additives in a kerosene system, with regard to both fluid loss and formation damage. The EP copolymers are at least as effective as the commercial materials in reducing the fluid loss and less additive is required. With a differential pressure of 500 p.s.i. the EP copolymers also gave considerably lower formation damage; while at the lower pressure, the formation damage with the EP copolymers was somewhat greater.

TABLE 8.—COMPARISON OF EP COPOLYMER WITH COMMERCIAL FLUID LOSS ADDITIVES IN KEROSENE

| Additive | Conc. (wt. percent) | Fluid Loss, 180° F., 1,000 p.s.i. | | | Percent Formation Damage 125° F. | |
|---|---|---|---|---|---|---|
| | | Spurt (ml.) | $C_w \times 10^3$ min. | Ml. in 25 min. | 500 p.s.i. | 100 p.s.i. |
| EP | 0.37 | 0.5–6 | 0.7–1.4 | 5–15 | 18–27 | 90–100 |
| Dowell J-97 [a] | 1.0 | 5–10 | 0.5–0.9 | 20 | 44 | 81 |
| Adomite Mark II [b] | 0.75 | 0–3.5 | 0.7–1.0 | 15 | 49 | 78 |

[a] Commercial product of the Dowell Division, Dow Chemical Company.
[b] Commercial product of the Continental Oil Company.

*Example 8.—Friction loss reduction*

Evidence of the utility of the EP copolymer at low concentration as a friction loss reduction additive is presented in Table 9. The friction loss tests are made using kerosene as a test fluid in a 0.215 inch SS tube having pressure taps located 9 feet apart. With a flow rate of 4.4 g.p.m. a normal pressure drop of 100 p.s.i. is obtained across the 9 foot test section.

Although variations are evident in the effectiveness of the different EP copolymers examined, three of the five copolymers gave a reduction at least equivalent to that of natural crepe rubber, one of the most effective known friction loss reduction additives.

TABLE 9.—REDUCTION IN FRICTION LOSS WITH EP COPOLYMERS

| Material | Percent Friction Loss Reduction | | |
|---|---|---|---|
| | 0.008 wt. percent | 0.037 wt. percent | 0.075 wt. percent |
| EP-1 | | 55 | |
| EP-2 | 31 | 60 | 58 |
| EP-3, 4, 6B | | 73 | |
| Crepe Rubber | 52 | 70 | 70 |

I claim:

A process for reducing the fluid flow friction loss in the transfer of a hydrocarbon fluid of the group consisting of hydrocarbon liquids and slurries thereof through a pipe at high velocity which consists essentially of intermixing with the hydrocarbon fluid from 0.01 to 0.3 wt. percent of an amorphous, high molecular weight copolymer of ethylene and at least one other $C_3$ to $C_6$ $\alpha$-olefin and transferring the resulting fluid through a pipe at high velocity.

References Cited

UNITED STATES PATENTS

| | | | |
|---|---|---|---|
| 2,492,173 | 12/1949 | Mysels | 137—13 |
| 2,596,843 | 5/1952 | Farris | 252—8.55 |
| 2,691,647 | 10/1954 | Field et al. | 252—59 |
| 2,779,735 | 1/1957 | Brown et al. | 252—8.55 |
| 2,825,721 | 3/1958 | Hogan et al. | 252—59 |
| 2,946,748 | 7/1960 | Steiner et al. | 252—8.55 |
| 3,046,222 | 7/1962 | Phansalker et al. | 252—8.55 |
| 3,083,160 | 3/1963 | Aguis et al. | 252—59 |
| 3,105,047 | 9/1963 | Miller et al. | 252—8.55 |

FOREIGN PATENTS

| | | |
|---|---|---|
| 710,109 | 6/1954 | Great Britain. |
| 728,220 | 4/1955 | Great Britain. |
| 554,803 | 1/1957 | Italy. |

LEON D. ROSDOL, *Primary Examiner.*

JULIUS GREENWALD, *Examiner.*

H. B. GUYNN, *Assistant Examiner.*